United States Patent
Zheng et al.

(10) Patent No.: US 10,336,896 B2
(45) Date of Patent: Jul. 2, 2019

(54) ONE-POT SYNTHESIS OF HIGHLY MECHANICAL AND RECOVERABLE DOUBLE-NETWORK HYDROGELS

(71) Applicants: Jie Zheng, Copley, OH (US); Qiang Chen, Jiaozuo (CN); Chao Zhao, Akron, OH (US)

(72) Inventors: Jie Zheng, Copley, OH (US); Qiang Chen, Jiaozuo (CN); Chao Zhao, Akron, OH (US)

(73) Assignee: The University of Akron, Akron, OH (US)

( * ) Notice: Subject to any disclaimer, the term of this patent is extended or adjusted under 35 U.S.C. 154(b) by 0 days.

(21) Appl. No.: 14/787,041

(22) PCT Filed: Apr. 23, 2014

(86) PCT No.: PCT/US2014/035071
§ 371 (c)(1),
(2) Date: Oct. 26, 2015

(87) PCT Pub. No.: WO2014/176304
PCT Pub. Date: Oct. 30, 2014

(65) Prior Publication Data
US 2016/0083574 A1    Mar. 24, 2016

Related U.S. Application Data

(60) Provisional application No. 61/815,778, filed on Apr. 25, 2013.

(51) Int. Cl.
C12C 11/02    (2006.01)
C08L 33/26    (2006.01)
(Continued)

(52) U.S. Cl.
CPC .......... *C08L 33/26* (2013.01); *C08B 37/0039* (2013.01); *C08J 3/075* (2013.01);
(Continued)

(58) Field of Classification Search
CPC .... C08L 33/26; C08L 5/00; C08L 5/12; C08J 3/075; C08J 2305/12; C08J 2333/26; C08J 2433/26; C08J 2405/12; C08B 37/0039
See application file for complete search history.

(56) References Cited

U.S. PATENT DOCUMENTS 8,293,510 B2    10/2012    Detamore
2003/0218130 A1    11/2003    Boschetti
(Continued)

FOREIGN PATENT DOCUMENTS

WO    2010132857 A1    11/2010

*Primary Examiner* — Jessica M Roswell
(74) *Attorney, Agent, or Firm* — Renner Kenner Greive Bobak Taylor & Weber

(57) ABSTRACT

A method of forming a hybrid physically and chemically cross-linked double-network hydrogel with highly recoverable and mechanical properties in a single-pot synthesis is provided. The method comprises the steps of combining the hydrogel precursor reactants into a single pot. The hydrogel precursor reactants include water; a polysaccharide; a methacrylate monomer; an ultraviolet initiator; and a chemical crosslinker. Next the hydrogel precursor reactants are heated to a temperature higher than the melting point of the polysaccharide and this temperature is retained until the polysaccharide is in a sol state. Then the single-pot is cooled to a temperature lower than the gelation point of the polysaccharide and this temperature is retained to form a first network. Thereafter, photo-initiated polymerization of the methacrylate monomer occurs via the ultraviolet initiator to form the second network.

14 Claims, 13 Drawing Sheets

(51) Int. Cl.
*C08B 37/00* (2006.01)
*C08L 5/12* (2006.01)
*C08J 3/075* (2006.01)
*C08L 5/00* (2006.01)

(52) U.S. Cl.
CPC .......................... *C08L 5/00* (2013.01); *C08L 5/12* (2013.01); *C08J 2305/12* (2013.01); *C08J 2333/26* (2013.01); *C08J 2405/12* (2013.01); *C08J 2433/26* (2013.01)

(56) References Cited

U.S. PATENT DOCUMENTS

| | | | | |
|---|---|---|---|---|
| 2006/0083773 | A1* | 4/2006 | Myung | A61F 2/142 |
| | | | | 424/427 |
| 2008/0317818 | A1* | 12/2008 | Griffith | A61K 9/0051 |
| | | | | 424/427 |
| 2009/0130755 | A1* | 5/2009 | Detamore | A61L 27/18 |
| | | | | 435/374 |

\* cited by examiner

ONE-POT SYNTHESIS OF HIGHLY MECHANICAL AND RECOVERABLE DOUBLE-NETWORK HYDROGELS

CROSS-REFERENCE TO RELATED APPLICATIONS

This application claims the benefit of U.S. Provisional Patent Application No. 61/815,778, filed Apr. 25, 2013, the contents of which are incorporated herein by reference.

STATEMENT REGARDING FEDERALLY SPONSORED RESEARCH OR DEVELOPMENT

This invention was made with government support under CBET-0952624 and CBET-1158447 awarded by the National Science Foundation. The government has certain rights in the invention.

FIELD OF THE INVENTION

Generally, the present invention relates to a new type of hybrid physically-chemically cross-linked double-network hydrogels. In particular, the present invention relates to a simple one-pot method to synthesize hybrid physically-chemically linked double-network hydrogels. More particularly, the present invention relates to a simple one-pot method to synthesize hybrid double-network hydrogels using thermo-reversible sol-gel polysaccharides.

BACKGROUND OF THE INVENTION

Hydrogels with three-dimensional cross-linked networks and high capacity of water or biological fluid have been intensively investigated for their potential biomedical applications in controlled drug delivery devices, micro fluidic devices, biosensors, tissue implants, and contact lenses. Most synthetic hydrogels suffer from poor mechanical properties (strength, extensibility, toughness, and recovery), due to their intrinsic structural heterogeneity and/or lack of efficient energy-dissipation mechanisms. Development of strong and flexible hydrogels with novel microstructures and excellent mechanical properties is still a challenging task. Many efforts have been made to design novel hydrogels with improved mechanical properties, such as double-network hydrogels, slide-ring hydrogels, nanocomposite hydrogels, triblock copolymers hydrogels, hydrophobic modified hydrogels, tetra-PEG gels, and macromolecular microsphere composite hydrogels.

Among them, double-network hydrogels consisting of two cross-linked networks with strong asymmetric structures have demonstrated to achieve improved and balanced mechanical properties between strength and toughness by tuning inter/intramolecular interactions and structures within and between two networks using a wide variety of polymeric monomers, cross-linkers, and cross-linked methods. Double-network hydrogels are usually synthesized via a multi-step sequential free-radical polymerization process. First, strong polyelectrolytes such as poly(2-aclylamido, 2-methyl,1-propanesulfonic acid) (PAMPS) are often used to form a highly covalently cross-linked, rigid and brittle, first network. Due to the highly swelling nature of strong polyelectrolytes, upon immersion of the polyelectrolyte hydrogels into a precursor solution containing neutral second monomers, initiators, and cross-linkers for the second polymerization, these reactants will diffuse into and react with the first brittle network to form a loosely cross-linked, soft and ductile, neutral, second network. These multi-step polymerization methods have demonstrated the feasibility to produce different high strength hydrogels, such as microgel-reinforced hydrogel, void double-network gels, inverse double-network gels, jellyfish gels, liquid crystalline double-network gels, and lamellar bilayers double-network gels.

However, use of multi-step methods for preparing double-network gels still encounters some challenges and limitations. Some challenges are (1) process tedious and time-consuming, which involves swelling, diffusion, and two polymerization processes, and also requires 1-2 days to complete the DN gels. (2) difficult to control, optimize, and determine experimental conditions. Due to the uncontrollable swelling and diffusion processes, it is rather difficult to control the exact mole ratio of the two networks and to reproduce the gels with similar mechanical properties even using the same conditions. This also causes a large amount of waste for unreacted second-network monomers. (3) lack of shape-flexibility. The two-step methods can not straightforward prepare different complex-shaped gels due to involvement of a swelling process. (4) Lack of self-recovery properties of DN gels. Most of DN hydrogels are chemically linked for both networks, which make the gels very difficult to be repaired and recovered from damages and fatigues, simply because of irreversible bond breaking. Several attempts have been made to overcome some of these drawbacks such as by modifying the first network/second network structure to increase their self-recovery properties or trying to simplify the preparation methods for the precursor reactants to diffuse into and react with the first network. However, all of the attempts still involved two or three polymerization step and an additional one to two swelling steps.

Therefore there is a need in the art for a novel, simple, and robust one-pot method to overcome these drawbacks which allow for the design and synthesis of a new type of hydrogels with highly mechanical and recoverable properties.

SUMMARY OF THE INVENTION

A first embodiment of this invention provides a method of forming a hybrid physically and chemically cross-linked double-network hydrogel with highly recoverable and mechanical properties in a single-pot synthesis comprising the steps of: combining the hydrogel precursor reactants including: water; a polysaccharide; a methacrylate monomer; an ultraviolet initiator; and a chemical crosslinker, to form a single pot mixture, heating the hydrogel precursor reactants to a temperature higher than the melting point of the polysaccharide and retaining this temperature until the polysaccharide is in a sol state, then cooling the single-pot to a temperature lower than the gelation point of the polysaccharide and retaining this temperature to form a first network; and thereafter photo-initiated polymerization of the methacrylate monomer via the ultraviolet initiator to form the second network.

A second embodiment of this invention provides a method as in the first embodiment, wherein the hydrogel precursor reactants are heated to a temperature of from 90-95° C.

A third embodiment of this invention provides a method as in any either the first or second embodiment, wherein the hydrogel precursor reactants are retained at the temperature higher than the melting point of the polysaccharide for a period of 3-5 minutes.

A fourth embodiment of this invention provides a method as in the first through third embodiments, wherein the single-pot is cooled to a temperature of from 30-40° C.

A fifth embodiment of this invention provides a method as in the first through fourth embodiments, wherein the cooled single-pot is retained at a temperature lower than the gelation point of the polysaccharide for a period of 15-30 minutes.

A sixth embodiment of this invention provides a method as in the first through fifth embodiments, wherein the polysaccharide as the first network is selected from the group consisting of agar, gelatin, sodium alginate, carrageenan, and other stimuli-responsive and reversible sol-gel systems such as supermolecular hydrogels and self-healing hydrogels.

A seventh embodiment of this invention provides a method as in the first through sixth embodiments, wherein the polysaccharide is agar.

A eighth embodiment of this invention provides a method as in the first through seventh embodiments, wherein the methacrylate monomer is selected from the group consisting of acrylamide, methylacrylamide, acrylic acid, N,N'-dimethylacrylamide, N-isopropylacrylamide, and ethylene glycol diacrylate.

A ninth embodiment of this invention provides a method as in the first through eighth embodiments, wherein the methacrylate monomer is acrylamide.

A tenth embodiment of this invention provides a method as in the first through ninth embodiments, wherein the ultraviolet initiator is 2-hydroxy-4'-(2-hydoxyethoxy)-2-methylpropiophenone and 2-oxoglutaric acid.

An eleventh embodiment of this invention provides a method as in the first through tenth embodiments, wherein the ultraviolet initiator is 2-hydroxy-4'-(2-hydoxyethoxy)-2-methylpropiophenone.

A twelfth embodiment of this invention provides a method as in the first through eleventh embodiments, wherein the chemical crosslinker is N, N'-methyl-bis-acrylamide and poly(ethylene glycol) diacrylate.

A thirteenth embodiment of this invention provides a method as in the first through twelfth embodiments, wherein the chemical crosslinker is N, N'-methyl-bis-acrylamide A fourteenth embodiment of this invention provides a method as in the first through thirteenth embodiments, wherein the first network is formed by the polysaccharide.

A fifteenth embodiment of this invention provides a method as in the first through fourteenth embodiments, wherein the second network is formed by the methacrylate polymer.

A sixteenth embodiment of this invention provides a method as in the first through fifteenth embodiments, wherein the hydrogel achieves a compression stress of up to 38 MPa.

A seventeenth embodiment of this invention provides a method as in the first through sixteenth embodiments, wherein the hydrogel achieves a tensile strength of up to 1.0 MPa.

An eighteenth embodiment of this invention provides a method as in the first through seventeenth embodiments, wherein the hydrogel achieves a fracture strain of up to 2000%.

A nineteenth embodiment of this invention provides a method as in the first through eighteenth embodiments, wherein the hydrogel achieves a toughness of up to 9 MJ/m$^3$.

A twentieth embodiment of this invention provides a method as in the first through nineteenth embodiments, wherein the hydrogel achieves a extensibility of up to 20 times longer than its initial length.

A twenty-first embodiment of this invention provides a method as in the first through twentieth embodiments, wherein the hydrogel achieves a fast recoverability of 65% toughness recovery within 10 min.

A twenty-second embodiment of this invention provides a method as in the first through twenty-first embodiments, wherein the hydrogel achieves a unique free-shapeable property of the formation of many complex geometrical shapes.

A twenty-third embodiment of this invention provides a method as in the first through twenty-second embodiments, wherein the hydrogel has a polysaccharide concentration of 20 mg/mL, a methacrylate monomer concentration of 3.4 mol/L, a ultraviolet initiator concentration of 1 mol % of methacrylate polymer, and a chemical crosslinker concentration of 0.03 mol % of methacrylate polymer.

A twenty-fourth embodiment of this invention provides a hybrid double-network hydrogel with highly mechanical and recoverable properties prepared by a process according to any of the forgoing embodiments.

DETAILED DESCRIPTION OF ILLUSTRATIVE EMBODIMENTS

Figure 1:
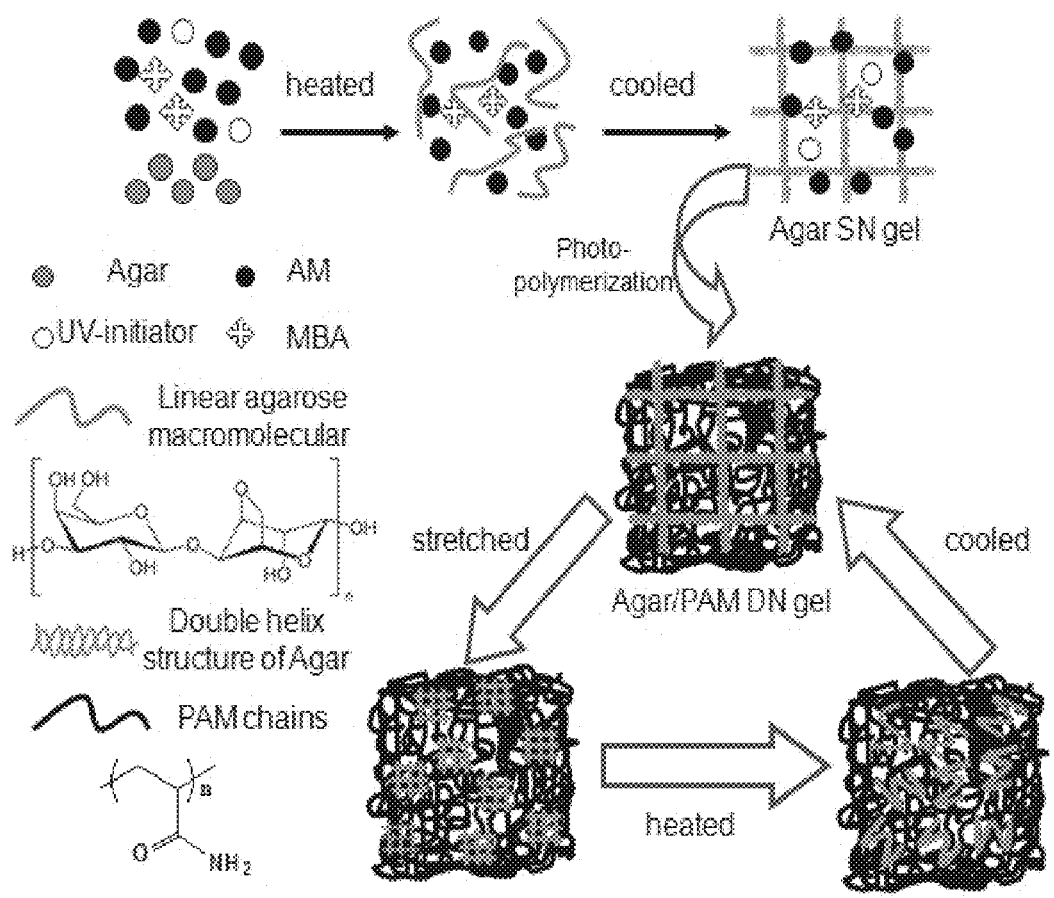
FIG. 1 shows the preparation procedure of thermo-responsive and recoverable Agar/Polyacrylamide Double Network Hydrogels

Embodiments of the invention are based, at least in part, on the discovery that agar biopolymer (a strong gelling polysaccharide derived from red seaweeds) which has a thermo-reversible so-gel transition. The agar forms gels upon cooling to 30-40° C., while melting to sols upon heating to 90-95° C. Since the sol-gel phase transition of agar is mainly attributed to the coil-helix structural transition between high and low temperatures, the phase transition is thermo-reversible. At higher temperatures above a melting point, the agars mainly adopt random coils in the sol state. Upon cooling, the gelation of agars occurs, involving a coil-to-helix transition and subsequent association and reorganization of the helices, which build up a three-dimensional network via helical bundles. Accordingly, embodiments of this invention are directed towards the method of forming double-network hydrogels that include the use of a polysaccharide such as agar as the physical network.

The method of forming a recoverable double-network hydrogel in a single-pot synthesis begins with the combining all hydrogel precursor reactants to form a single pot mixture. The hydrogel precursor reactants include water, a polysaccharide, a methacrylate monomer, an ultraviolet initiator, and a chemical crosslinker. The hydrogel precursor reactants are heated to a temperature higher than the melting point of the polysaccharide and this temperature is retained until the polysaccharide is in a sol state. Then, the single-pot is cooled to a temperature lower than the gelation point of the polysaccharide and this temperature is retained until the first network is formed. Thereafter, photo-initiated polymerization of the methacrylate monomer via the ultraviolet initiator occurs to form the second network.

Practice of this invention is not limited by the temperature that the hydrogel precursors can be heated to or by the duration in which they should be heated for. An exemplary temperature to heat the hydrogel precursors to is from 90° C. or more to 95° C. or less for a period of 3 to 5 minutes.

Practice of this invention is likewise not limited by the temperature that the single-pot should be cooled to once heated or by the duration of time in which the single pot is cooled for. An exemplary temperature to cool the single pot to once heated, is from 30° C. or more to 40° C. or less for a period of 15 to 30 minutes.

Practice of this invention is not limited by the selection of any particular polysaccharide as the first network. Exemplary polysaccharides include agar, gelatin, sodium alginate, carrageenan, and other stimuli-responsive and reversible sol-gel systems such as supermolecular hydrogels and self-healing hydrogels as the first network.

Practice of this invention is likewise not limited by the selection of any particular methacrylate monomers as the second network. Exemplary methacrylate monomers include acrylamide, methylacrylamide, acrylic acid, N,N'-dimethylacrylamide, N-isopropylacrylamide, and ethylene glycol diacrylate. The preferred range of methacrylate monomer is from 1.4 mol/L to 8.4 mol/L.

Practice of this invention is also likewise not limited by the selection of any particular ultraviolet initiator. Exemplary ultraviolet initiators include 2-hydroxy-4'-(2-hydoxyethoxy)-2-methylpropiophenone and 2-oxoglutaric acid. The preferred range of ultraviolet initiator is from 0.1% to 1%.

Practice of the invention is also not limited by the selection of any particular chemical crosslinker. Exemplary chemical crosslinkers include N, N'-methyl-bis-acrylamide and poly(ethylene glycol) diacrylate.

In a particular embodiment, i.e. Agar/Polyacrylamide Double Network Hydrogel, the polysaccharide is agar, the methacrylate monomer is polyacrylamide, the ultraviolet initiator is 2-hydroxy-4'-(2-hydoxyethoxy)-2-methylpropiophenone, and the chemical crosslinker is N, N'-methyl-bis-acrylamide.

In a particular embodiment the polysaccharide to methacrylate monomer ratio is 1:12.

As depicted in FIG. 1, all the hydrogel precursor reactants of a polysaccharide; a methacrylate monomer; an ultraviolet initiator; and a chemical crosslinker were added to a single water pot for synthesizing a double network hydrogel via a heating-cooling-photopolymerization process. Using the unique thermo-responsive property of polysaccharides, the main gel fraction in the chosen polysaccharide is first dissolved at a temperature higher than the melting point of the polysaccharide and this temperature is retained until the polysaccharide is in a sol state. This will form linear macromolecules, resulting in a transparent, low viscous solution upon heating. Then, the single-pot is cooled to a temperature lower than the gelation point of the polysaccharide and this temperature is retained until the polysaccharide forms the first-network gel that is physical-linked. Upon photo-initiation, the loose chemically cross-linked methacrylate monomer gel forms as the second network, and a double-network hydrogel is successfully synthesized. By using a simple one-pot strategy, the uncontrollable swelling process and unnecessary diffusion process for the precursor reactants to diffuse into and react with the first network are eliminated, and this process is able to readily produce and optimize double network hydrogels in a fast and controllable manner. Moreover, due to the thermo-reversible nature of most polysaccharides, the double network hydrogels formed by the process can be recovered from the softening by simply tuning temperatures. The whole process of DN gels usually took 1-2 hours to complete.

Figure 2:
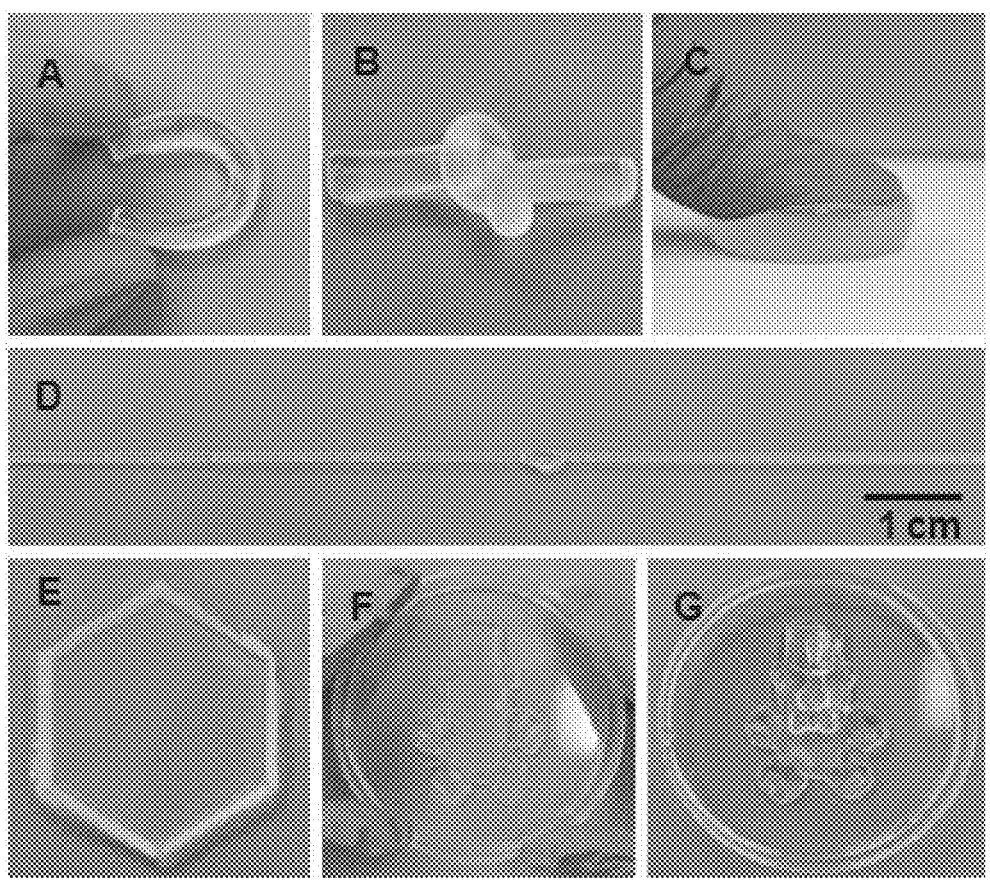
FIG. 2A shows the Agar/Polyacrylamide Double Network Hydrogel formed in FIG. 1 being bent.
FIG. 2B shows the Agar/Polyacrylamide Double Network Hydrogel formed in FIG. 1 being knotted.
FIG. 2C shows the Agar/Polyacrylamide Double Network Hydrogel formed in FIG. 1 being compressed.
FIG. 2D shows the Agar/Polyacrylamide Double Network Hydrogel formed in FIG. 1 being stretched.
FIG. 2E shows the Agar/Polyacrylamide Double Network Hydrogel formed in FIG. 1 in the shape of a hexagon.
FIG. 2F shows the Agar/Polyacrylamide Double Network Hydrogel formed in FIG. 1 in the shape of a teddy bear being compressed.
FIG. 2G shows the Agar/Polyacrylamide Double Network Hydrogel formed in FIG. 2F in the shape of a teddy bear after force release.

As shown in FIGS. 2A-2G, the double network hydrogels formed by this process exhibit extraordinary mechanical and free-shapeable properties. The hydrogels were highly tough and able to withstand high-level deformations of bending (FIG. 2A), knotting (FIG. 2B), compression (FIG. 2C), and elongation (FIG. 2D) without any observable damage. Particularly, upon removal of the deformation force, the hydrogels quickly recovered to their initial shapes, indicating that the gels exhibit excellent shape-recovery property. Because of the adaptable gel-forming ability and the simple one-pot method, the double network gels formed by this process can be readily adapted to different complex shapes, including a hexagon (FIG. 2E) and teddy bears with fine facial features in both force-compression forms (FIG. 2F) and force-release forms (FIG. 2G). Moreover, the use of different molds enables to produce different shapes of DN gels.

Figure 3A:
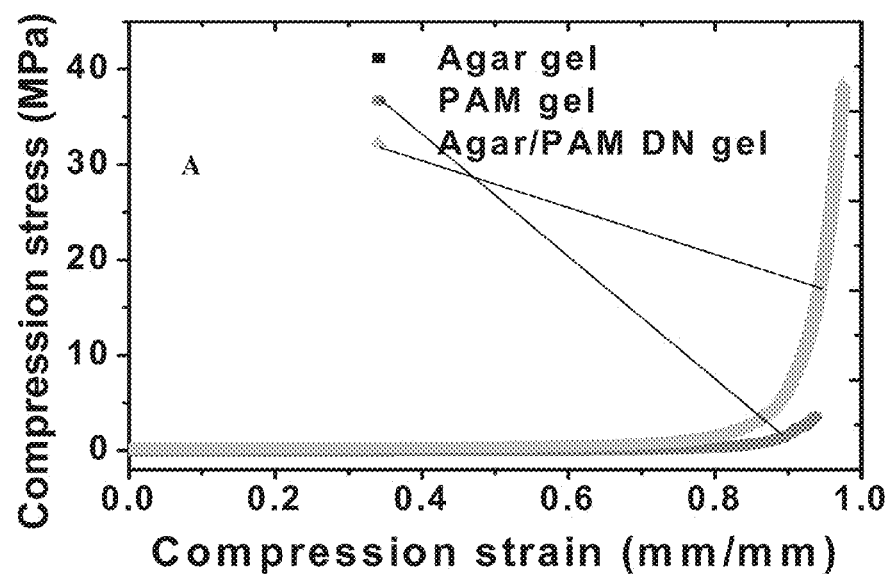
FIG. 3A shows the comparison of compression properties between the Agar/Polyacrylamide Double Network Hydrogel, an agar single network gel, and a polyacrylamide single network gel.
Figure 3B:
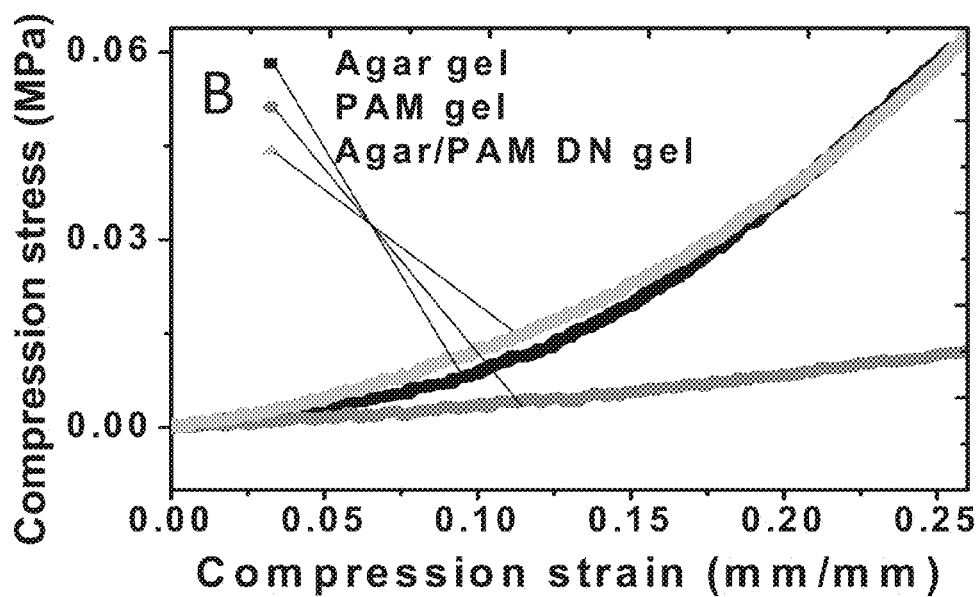
FIG. 3B shows a zoom-in comparison of compression properties between the Agar/Polyacrylamide Double Network Hydrogel, an agar single network gel, and a polyacrylamide single network gel

Testing was done on a particular embodiment of the present invention wherein the polysaccharide was agar, the methacrylate monomer was polyacrylamide, the ultraviolet initiator was 2-hydroxy-4'-(2-hydoxyethoxy)-2-methylpropiophenone, and the chemical crosslinker was N, N'-methyl-bis-acrylamide. FIGS. 3A through 3D show the compression and tensile properties of the double network hydrogel as compared to a polyacrylamide single network gel and an agar single network gel. As shown in FIG. 3a, the double network hydrogel achieved a maximum compression stress of 38 MPa, which was 10 times higher than the polyacrylamide single-network gels (3.8 MPa) and 633 times higher than the agar single network gel (0.06 MPa).

Figure 3C:
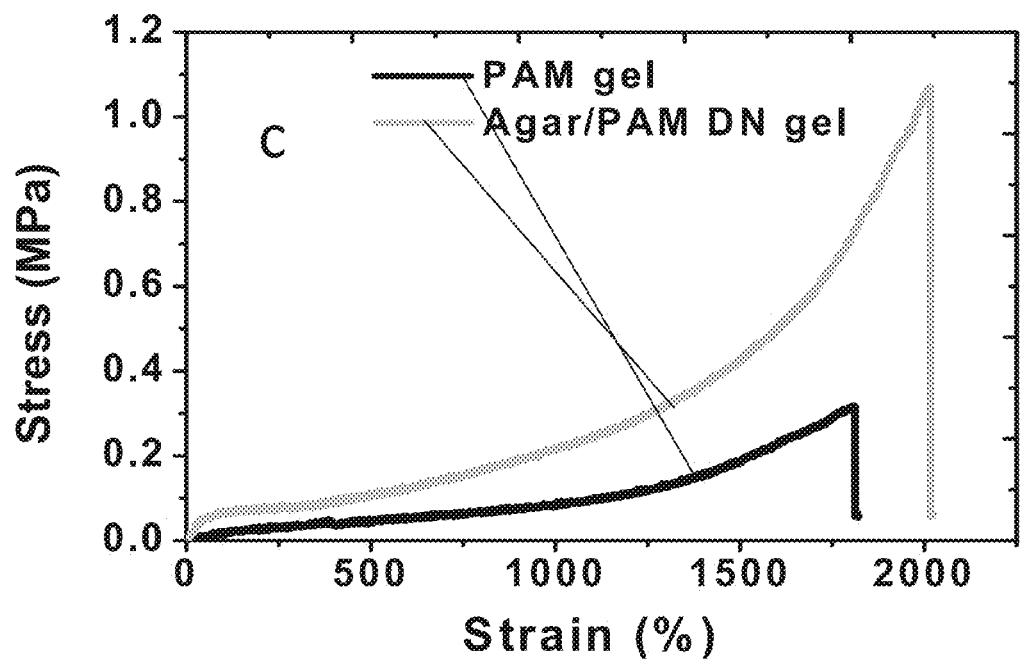
FIG. 3C shows the comparison of tensile properties between the Agar/Polyacrylamide Double Network Hydrogel and a polyacrylamide single network gel. An agar single network gel cannot even be tested by tensile experiments due to its extremely brittle nature.
Figure 3D:
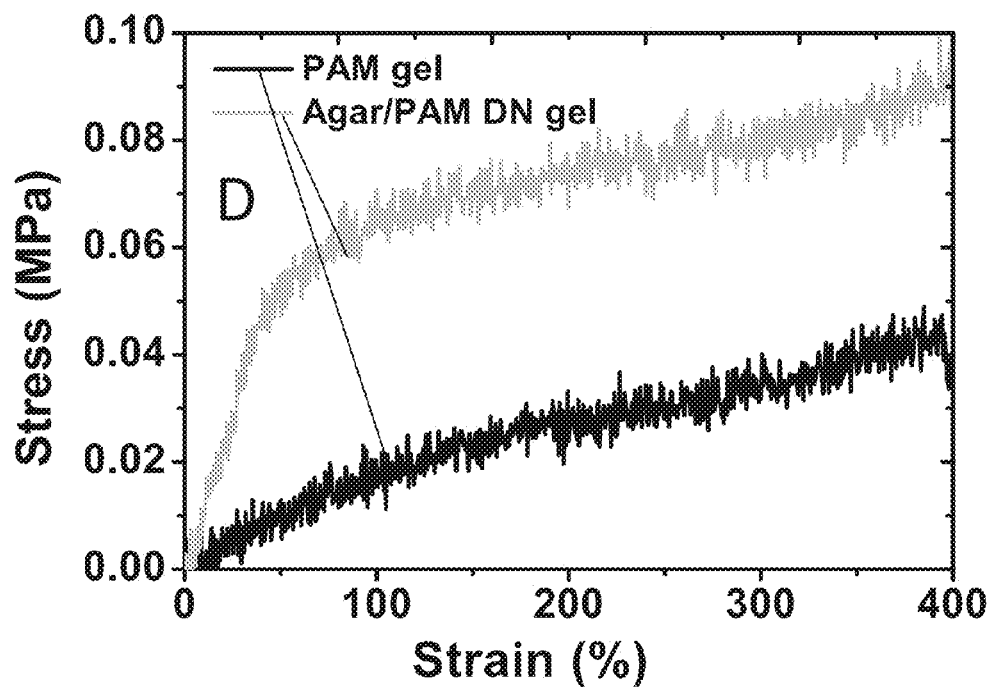
FIG. 3D shows a zoom-in comparison of tensile properties between the Agar/Polyacrylamide Double Network Hydrogel and a polyacrylamide single network gel. An agar single network gel cannot even be tested by tensile experiments due to its extremely brittle nature.
Figure 4A:
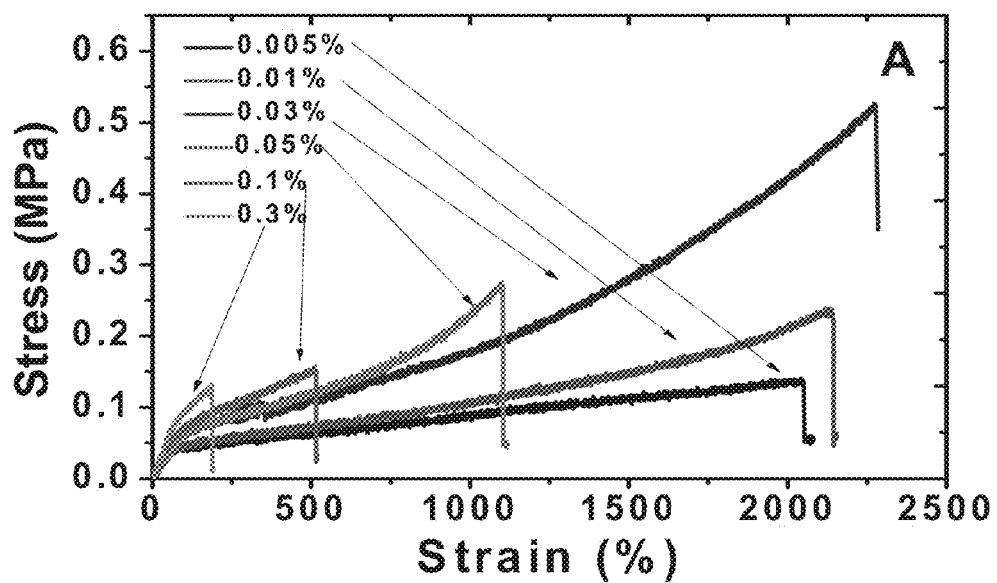
FIG. 4A shows the effect of cross-linker contents of MBA/AM (mol %) on tensile stress-strain curves of Agar/Polyacrylamide Double Network Hydrogels, under the other preparation conditions of 10/90 ratio of Agar/acrylamide, 0.03 mol % of N, N'-methyl-bis-acrylamide of polyacrylamide, and 1 mol % of 2-hydroxy-4'-(2-hydoxyethoxy)-2-methylpropiophenone of polyacrylamide.
Figure 4B:
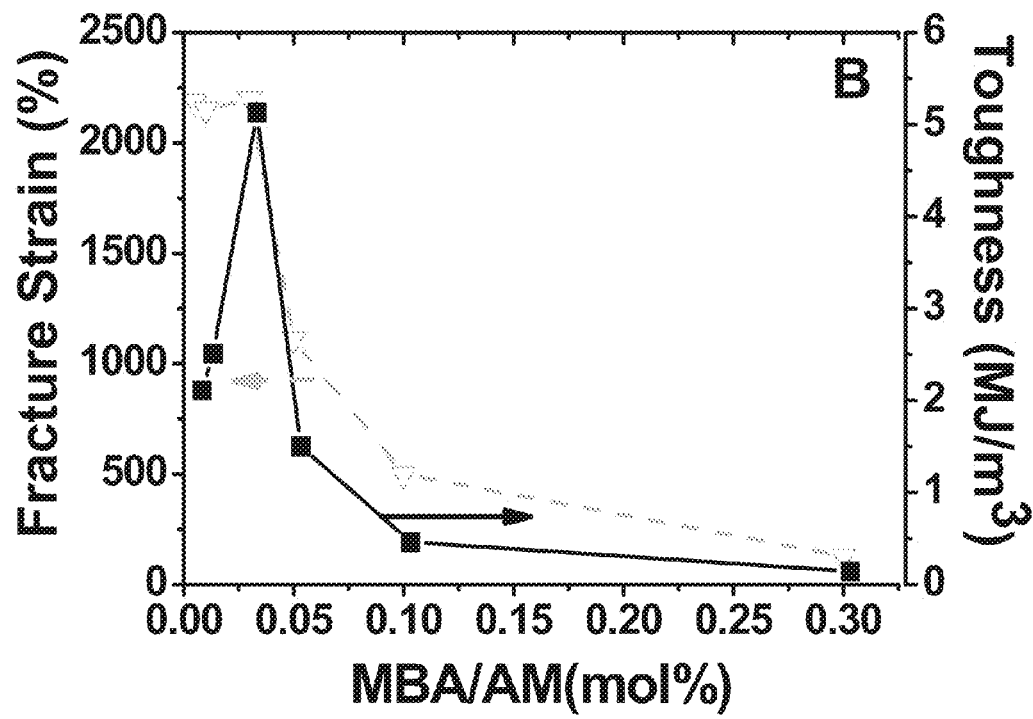
FIG. 4B shows the effect of cross-linker contents of MBA/AM (mol %) on fracture strain and toughness of Agar/Polyacrylamide Double Network Hydrogels, under the other preparation conditions of 0.005%-0.3% cross-linkers, 10/90 ratio of Agar/acrylamide, 0.03 mol % of N, N'-methyl-bis-acrylamide of polyacrylamide, and 1 mol % of 2-hydroxy-4'-(2-hydoxyethoxy)-2-methylpropiophenone of polyacrylamide.
Figure 4C:
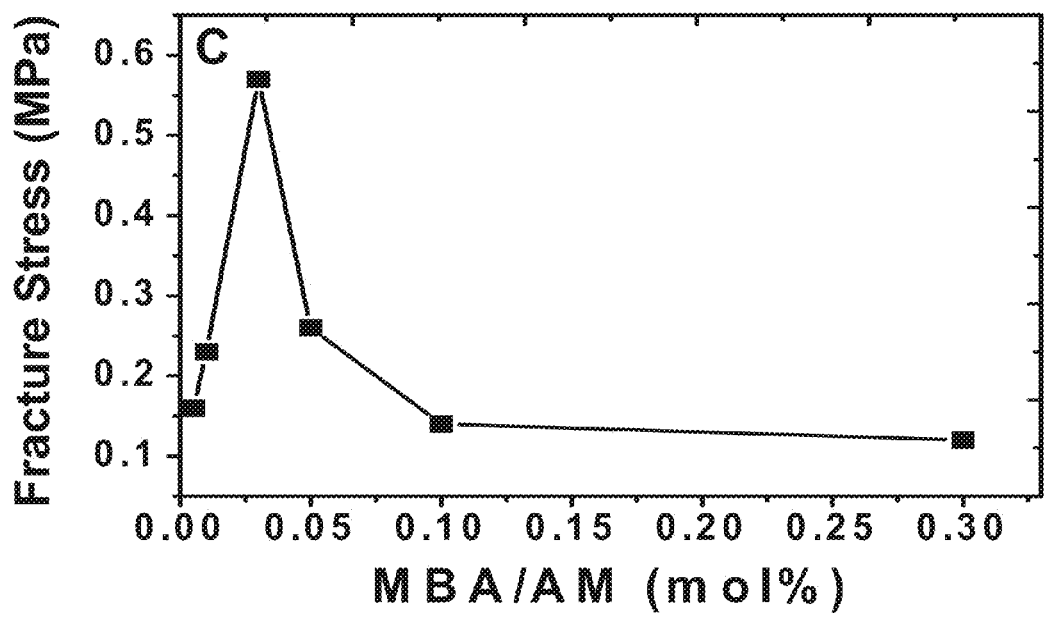
FIG. 4C shows the effect of cross-linker contents of MBA/AM (mol %) on fracture stress of Agar/Polyacrylamide Double Network Hydrogels, under the other preparation conditions of 0.005%~0.3% cross-linkers, 10/90 ratio of Agar/acrylamide, 0.03 mol % of N, N'-methyl-bis-acrylamide of polyacrylamide, and 1 mol % of 2-hydroxy-4'-(2-hydoxyethoxy)-2-methylpropiophenone of polyacrylamide.
Figure 4D:
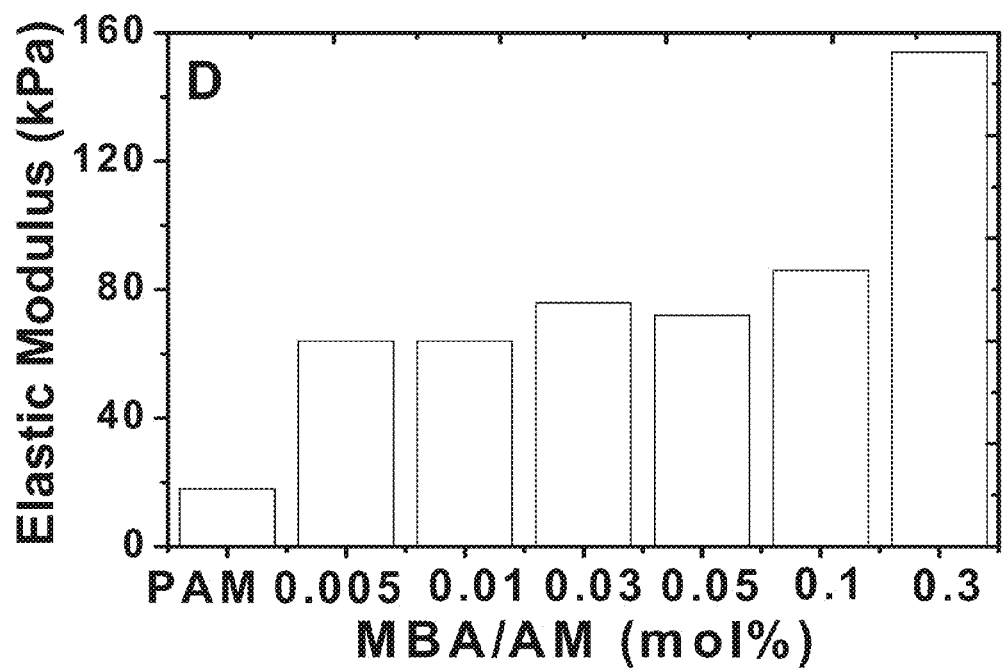
FIG. 4D shows the effect of cross-linker contents of MBA/AM (mol %) on elastic modulus of polyacrylamide Single Network hydrogel and Agar/Polyacrylamide Double Network Hydrogels, under the other preparation conditions of 0.005%~0.3% cross-linkers, 10/90 ratio of Agar/acrylamide, 0.03 mol % of N, N'-methyl-bis-acrylamide of polyacrylamide, and 1 mol % of 2-hydroxy-4'-(2-hydoxyethoxy)-2-methylpropiophenone of polyacrylamide.
Figure 5A:
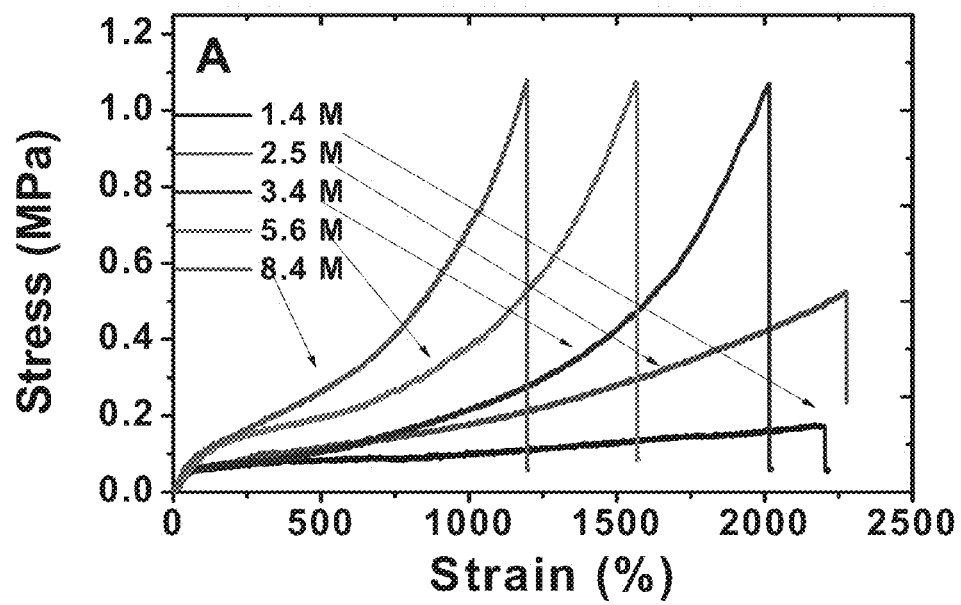
FIG. 5A shows the effect of acrylamide monomer concentrations (1.4~8.4 mol/L) on tensile stress-strain curves of Agar/Polyacrylamide Double Network Hydrogels, under the other preparation conditions of 20 mg/mL Agar, 0.03 mol % of N, N'-methyl-bis-acrylamide of polyacrylamide, and 1 mol % of 2-hydroxy-4'-(2-hydoxyethoxy)-2-methylpropiophenone of polyacrylamide.
Figure 5B:
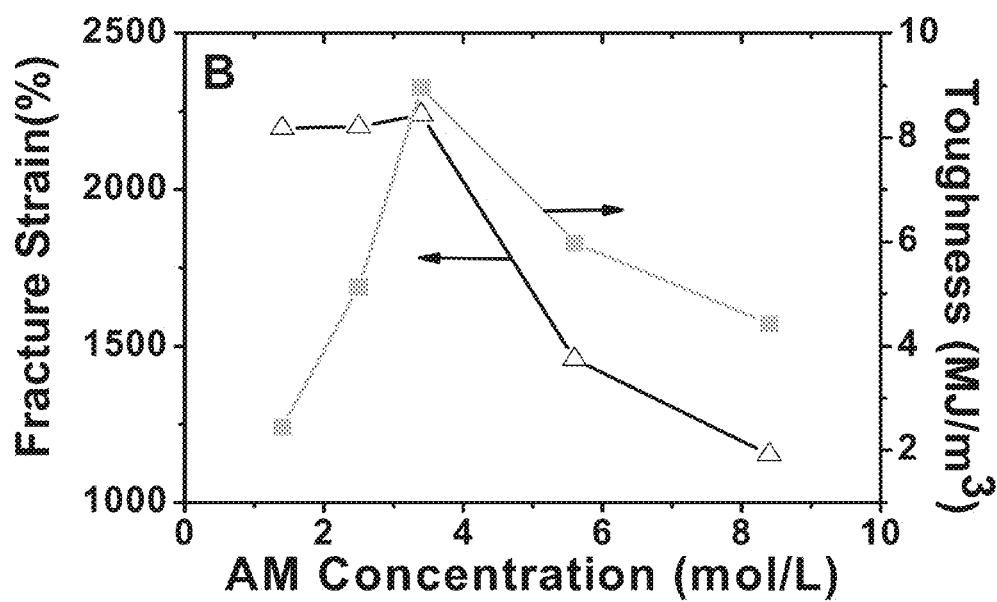
FIG. 5B shows the effect of acrylamide monomer concentrations (1.4~8.4 mol/L) on fracture strain and toughness of Agar/Polyacrylamide Double Network Hydrogels, under the other preparation conditions of 20 mg/mL Agar, 0.03 mol % of N, N'-methyl-bis-acrylamide of polyacrylamide, and 1 mol % of 2-hydroxy-4'-(2-hydoxyethoxy)-2-methylpropiophenone of polyacrylamide.
Figure 5C:
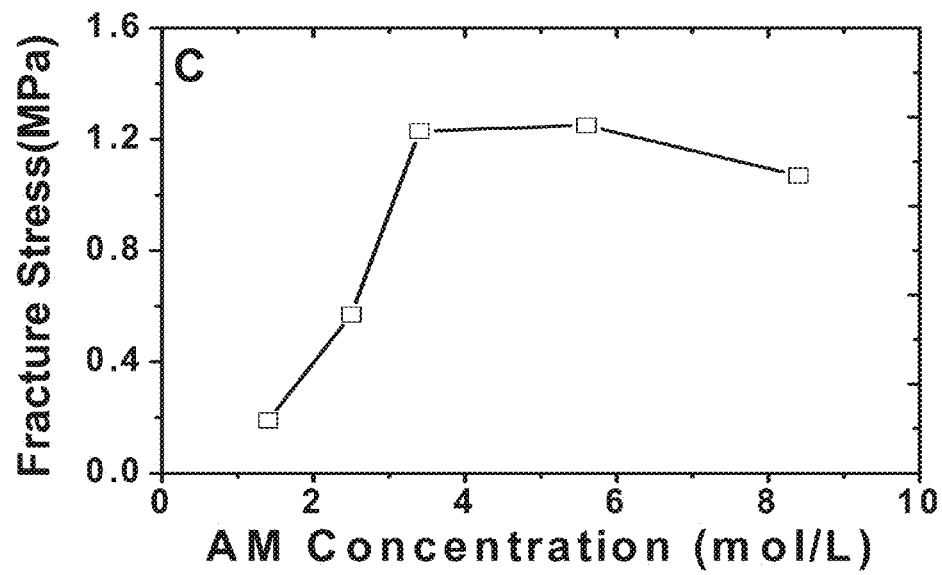
FIG. 5C shows the effect of acrylamide monomer concentrations (1.4~8.4 mol/L) on fracture stress of Agar/Polyacrylamide Double Network Hydrogels, under the other preparation conditions of 20 mg/mL Agar, 0.03 mol % of N, N'-methyl-bis-acrylamide of polyacrylamide, and 1 mol % of 2-hydroxy-4'-(2-hydoxyethoxy)-2-methylpropiophenone of polyacrylamide.
Figure 5D:
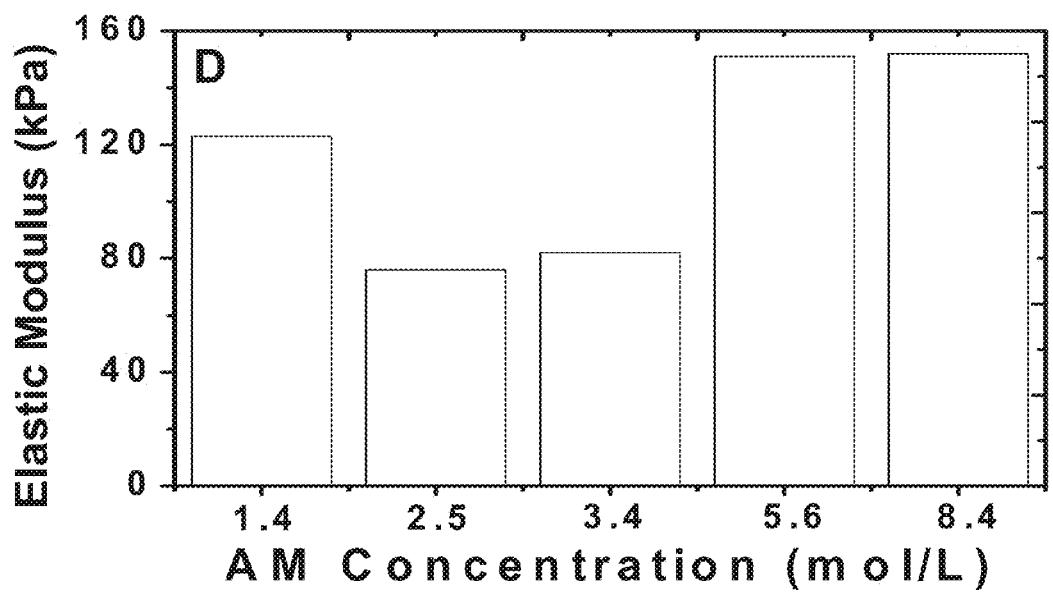
FIG. 5D shows the effect of acrylamide monomer concentrations (1.4~8.4 mol/L) on elastic modulus of Polyacrylamide Single Network hydrogel and Agar/Polyacrylamide Double Network Hydrogels, under the other preparation conditions of 20 mg/mL Agar, 0.03 mol % of N, N'-methyl-bis-acrylamide of polyacrylamide, and 1 mol % of 2-hydroxy-4'-(2-hydoxyethoxy)-2-methylpropiophenone of polyacrylamide.

The fracture strain and elastic modulus were 98% and 123 kPa for the double network hydrogel, 94% and 34 kPa for the polyacrylamide gel, and less than 26% and 84 kPa for the agar gel, respectively. These results clearly indicate that the properties at rupture of the double network hydrogel far exceed those of either of its parent single network gels. The double network hydrogel also displayed much better tensile properties than the agar or polyacrylamide gels, as shown in FIGS. 3C and 3D. The double network hydrogel can achieve a tensile strength of approximately 1.0 MPa, a fracture strain of approximately 2000%, and a toughness of approximately 9 MJ/m$^3$. In contrast, the polyacrylamide gel exhibited much weaker stress-strain properties as evidenced by the smaller values of tensile strength (0.3 MPa), fracture strain (approximately 1800%), and toughness (approximately 1.9 MJ/m$^3$). The agar gel could not even be tested by tensile experiments due to its extremely brittle nature.

A series of tensile tests was performed on the double network hydrogel to quantitatively examine the mechanical properties of the double network hydrogels in response to the changes in chemical crosslinker concentration, changes in the molar ratio of agar to polyacrylamide (AM), changes in the water content, changes in the initiator concentration, and changes to the concentration of AM. The effects of different polymerization conditions on the mechanical properties of double network hydrogels are shown in Table 1 below and FIGS. 4A-4D and 5A-5D. The optimal polymerization conditions of this particular embodiment, were determined to be an agar concentration of 20 mg/mL, a polyacrylamide concentration of 3.4 mol/L, N, N'-methyl-bis-acrylamide concentration of 0.03 mol % of polyacrylamide, and a 2-hydroxy-4'-(2-hydoxyethoxy)-2-methylpropiophenone concentration of 1 mol % of polyacrylamide.

TABLE 1

| Agar/AM (g/g) | Water Content (wt %) | $I_2$/AM (mo %) | σ (MPa) | ε (%) | E (kPa) | Toughness (MJ/m³) |
|---|---|---|---|---|---|---|
| 0/100 | 83.3 | 1 | 0.33 | 1845 | 18 | 1.92 |
| 15/85 | 83.3 | 1 | 0.47 | 1820 | 121 | 3.75 |
| 10/90 | 83.3 | 1 | 0.57 | 2201 | 76 | 5.13 |
| 10/90 | 90.9 | 1 | 0.04 | 488 | 11 | 0.13 |
| 10/90 | 80.6 | 1 | 0.97 | 2297 | 51 | 7.46 |
| 10/120 | 79.4 | 1 | 1.23 | 2240 | 82 | 8.96 |
| 10/120 | 79.4 | 0.1 | 0.97 | 1859 | 138 | 4.80 |

Figure 6A:
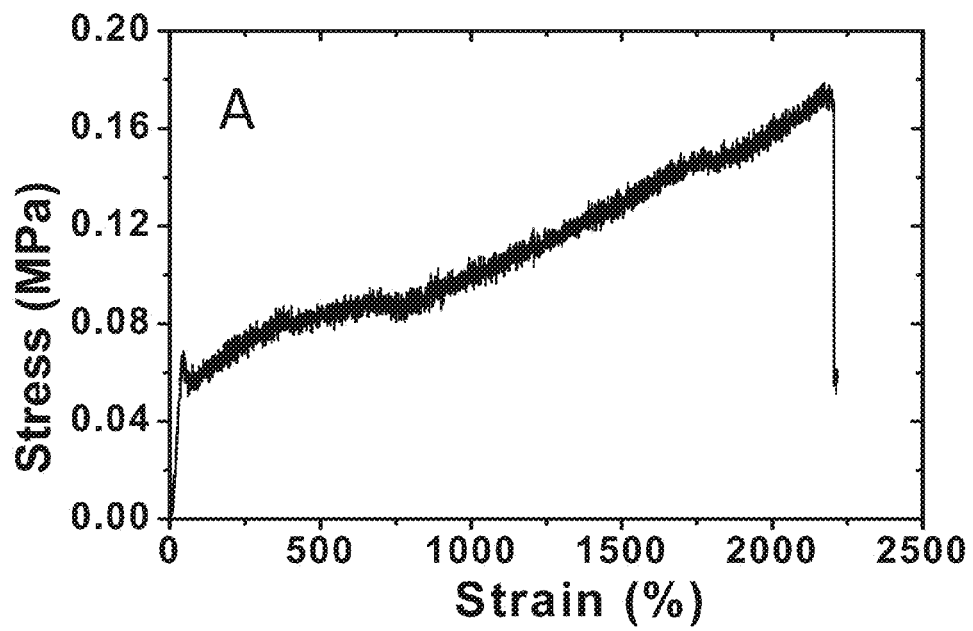
FIG. 6A shows the yielding of an Agar/Polyacrylamide Double Network Hydrogel prepared with 20 mg/mL agar, 1.4 mol/L polyacrylamide, 0.03 mol % of N, N'-methyl-bis-acrylamide of polyacrylamide, and 1 mol % of is 2-hydroxy-4'-(2-hydoxyethoxy)-2-methylpropiophenone of polyacrylamide.
Figure 6B:
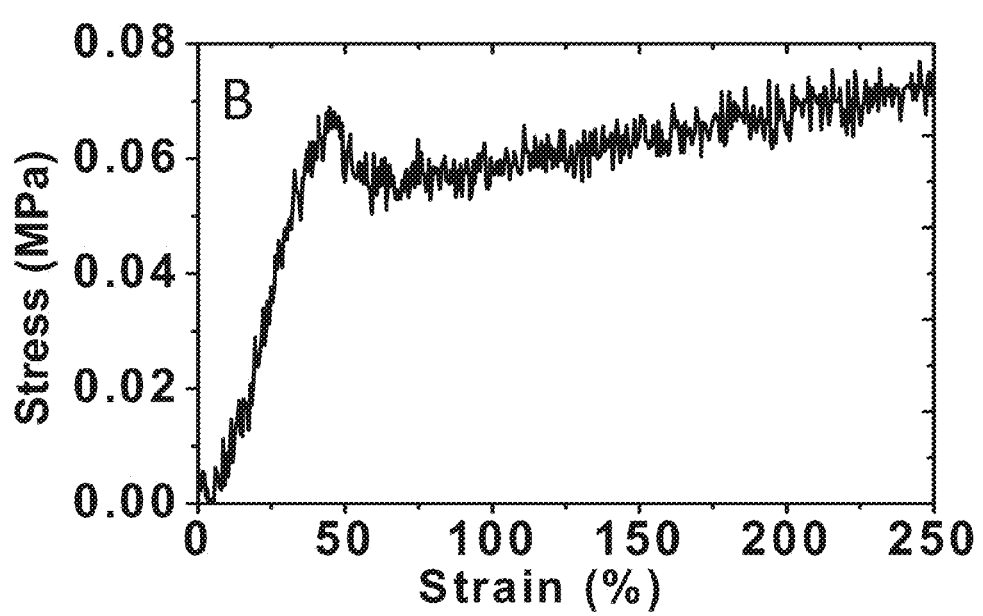
FIG. 6B also shows the yielding of an Agar/Polyacrylamide Double Network Hydrogel prepared with 20 mg/mL agar, 1.4 mol/L polyacrylamide, 0.03 mol % of N, N'-methyl-bis-acrylamide of polyacrylamide, and 1 mol % of is 2-hydroxy-4'-(2-hydoxyethoxy)-2-methylpropiophenone of polyacrylamide.
Figure 6C:
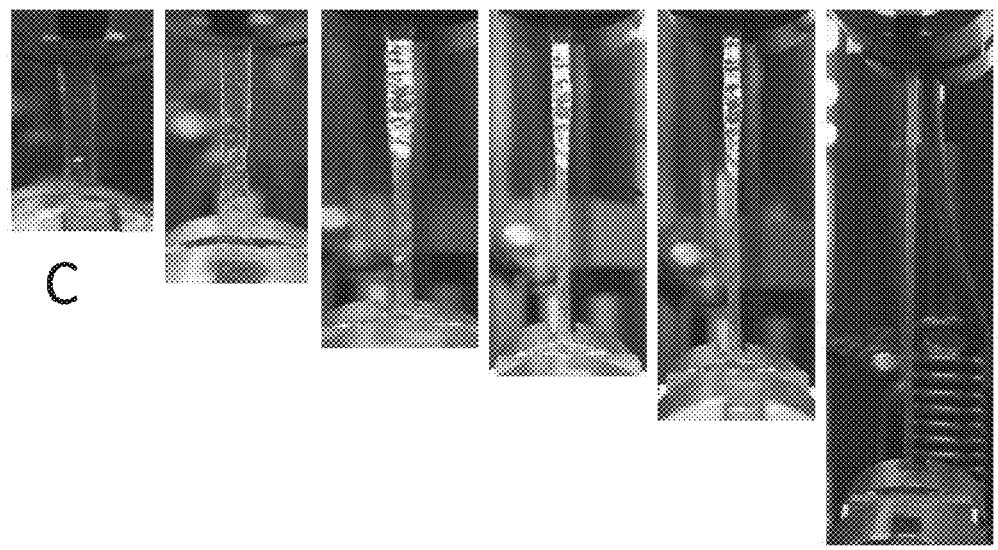
FIG. 6C shows the necking of an Agar/Polyacrylamide Double Network Hydrogel prepared with 20 mg/mL agar, 1.4 mol/L polyacrylamide, 0.03 mol % of N, N'-methyl-bis-acrylamide of polyacrylamide, and 1 mol % of is 2-hydroxy-4'-(2-hydoxyethoxy)-2-methylpropiophenone of polyacrylamide.

Interestingly, both yielding and necking phenomena were observed in the double network hydrogels. The stress-strain curve of the Agar/Polyacrylamide double network hydrogel prepared at 1.4 M polyacrylamide concentration clearly displayed a yielding region, as shown by a peak at the low strain of 50% (FIG. 6A and FIG. 6B). More impressively, visual inspection of the stretching of the same hydrogel also shows a necking phenomenon (FIG. 6C). Neither yielding nor necking phenomena was observed for polyacrylamide single network gels.

Figure 6D:
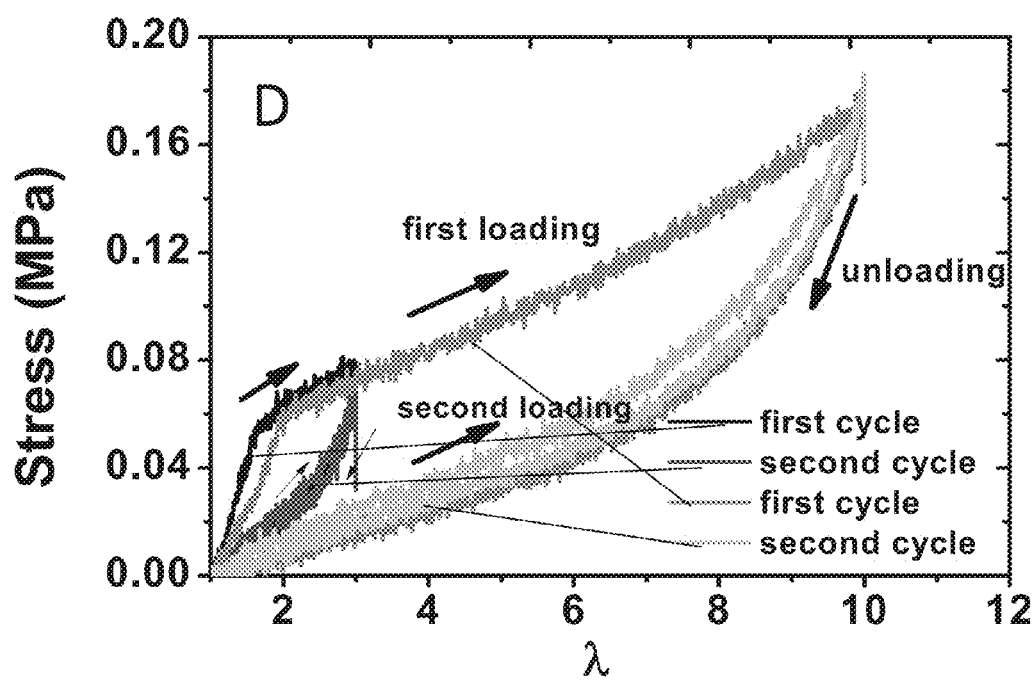
FIG. 6D shows the first and immediate second loading cycles of an Agar/Polyacrylamide Double Network Hydrogel with different maximum stretch prepared with 20 mg/mL agar, 3.4 mol/L polyacrylamide, 0.03 mol % of N, N'-methyl-bis-acrylamide of polyacrylamide, and 1 mol % of is 2-hydroxy-4'-(2-hydoxyethoxy)-2-methylpropiophenone of polyacrylamide.
Figure 6E:
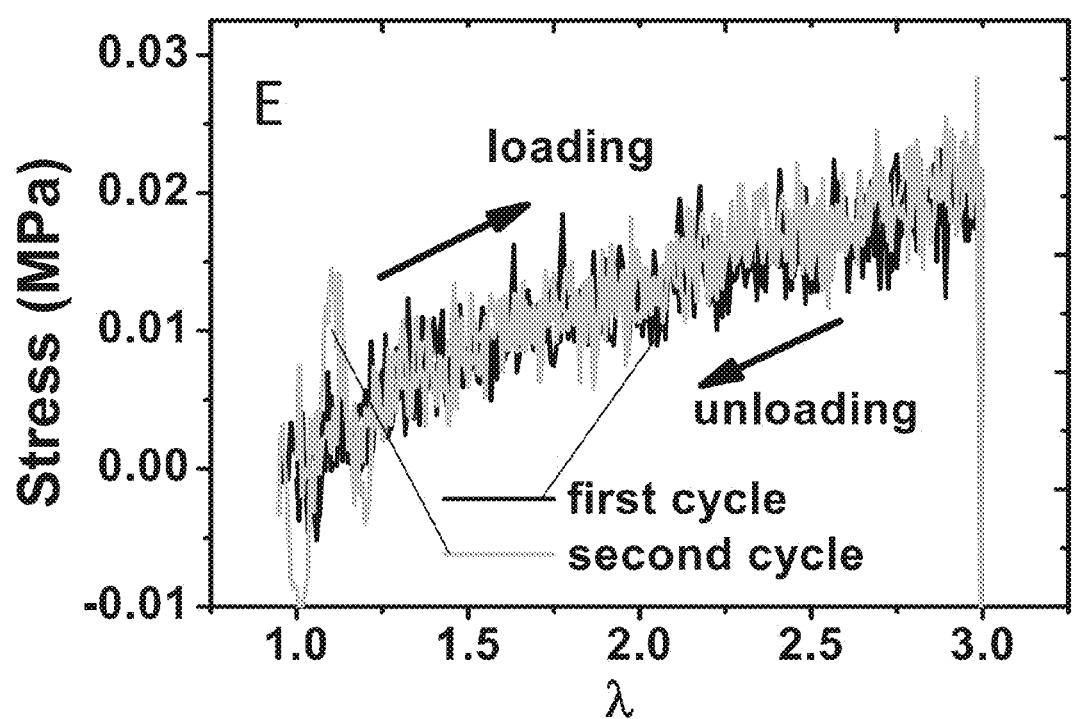
FIG. 6E shows the first and immediate second loading-unloading cycles of PAM Single Network gels, at 3.4 mol/L AM, 0.1 mol % MBA of AM, and 1 mol % UV-initiator of AM. In contrast to Agar/Polyacrylamide Double Network Hydrogel in FIG. 6C, the PAM SN gels showed a negligible and overlapped hysteresis in the first and second loading cycles, indicating no recovery behavior.
Figure 7A:
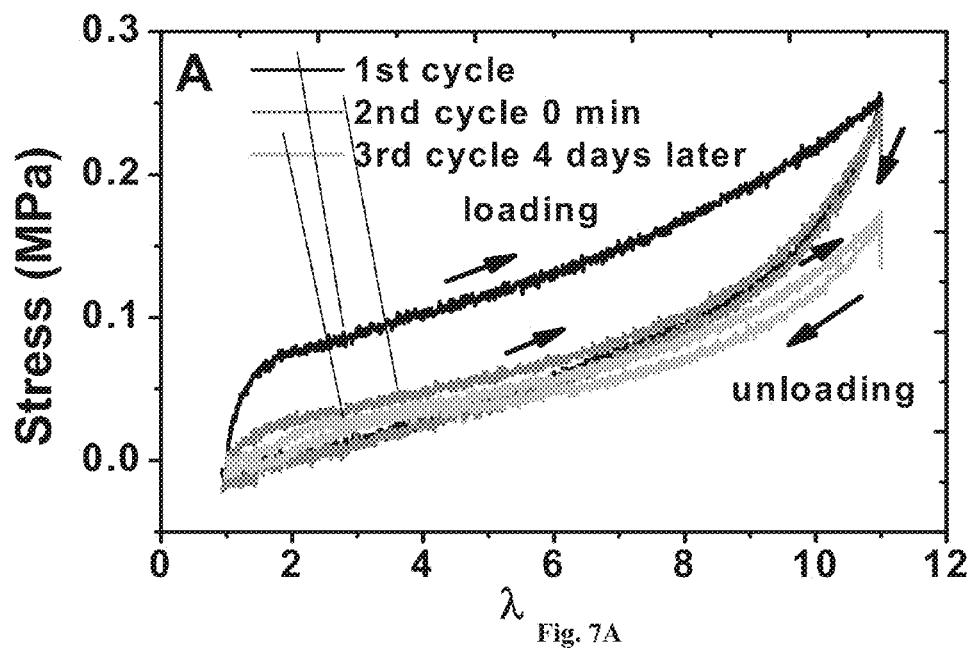
FIG. 7A shows three successive loading-unloading cycles of Agar/Polyacrylamide Double Network Hydrogel at room temperature wherein the hydrogel was prepared with 20 mg/mL agar, 3.4 mol/L polyacrylamide, 0.03 mol % of N, N'-methyl-bis-acrylamide of polyacrylamide, and 1 mol % of is 2-hydroxy-4'-(2-hydoxyethoxy)-2-methylpropiophenone of polyacrylamide.

Loading-unloading experiments were performed to evaluate the energy dissipation of the double network hydrogels. A large hysteresis loop was observed in the first loading-unloading cycle, suggesting that the double network hydrogels dissipate energy effectively. After the immediate second cycle, hysteresis becomes much smaller; indicating the network structure of the double network hydrogels was changed, leading to the occurrence of softening, as shown in FIG. 6D. In contrast, the polyacrylamide single network gels showed a negligible and overlapped hysteresis in the first and second loading cycles, indicating a typical rubber elastic behavior (FIG. 6E). The double network hydrogels also performed the third loading-unloading cycle after 4 days (FIG. 7A). The third hysteresis loop remained similar in size to the second hysteresis loop, indicating that the network structure of the double network hydrogels do not experience obvious changes even after 4 days at room temperature.

Figure 7B:
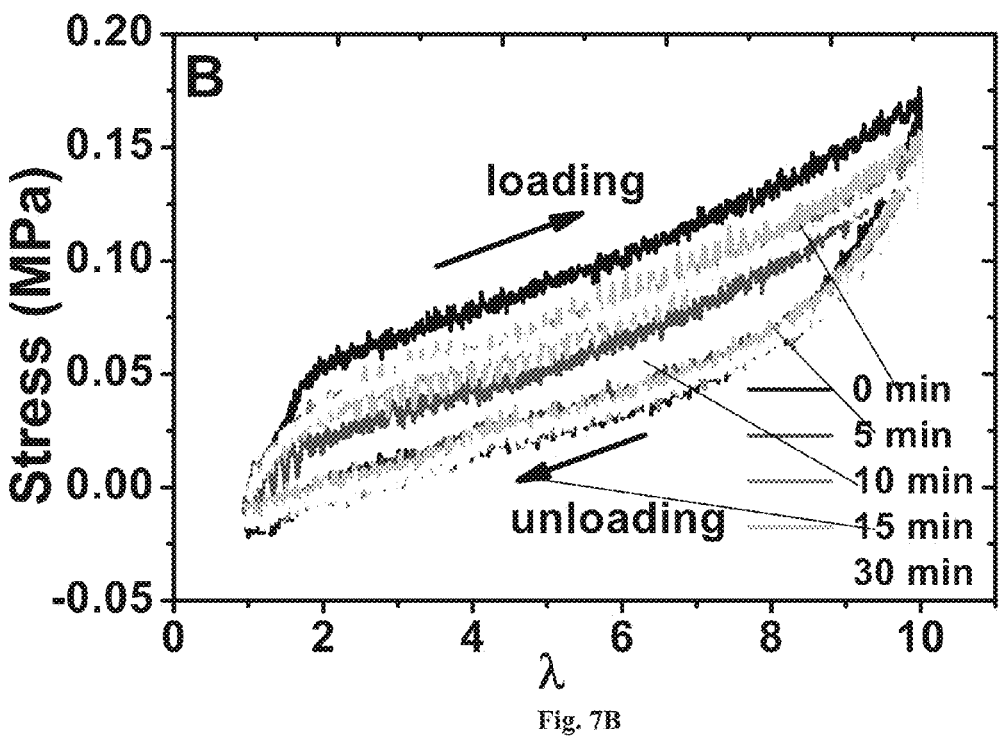
FIG. 7B shows the recovery of the Agar/Polyacrylamide Double Network Hydrogel of FIG. 7A stored at 100° C.
Figure 7C:
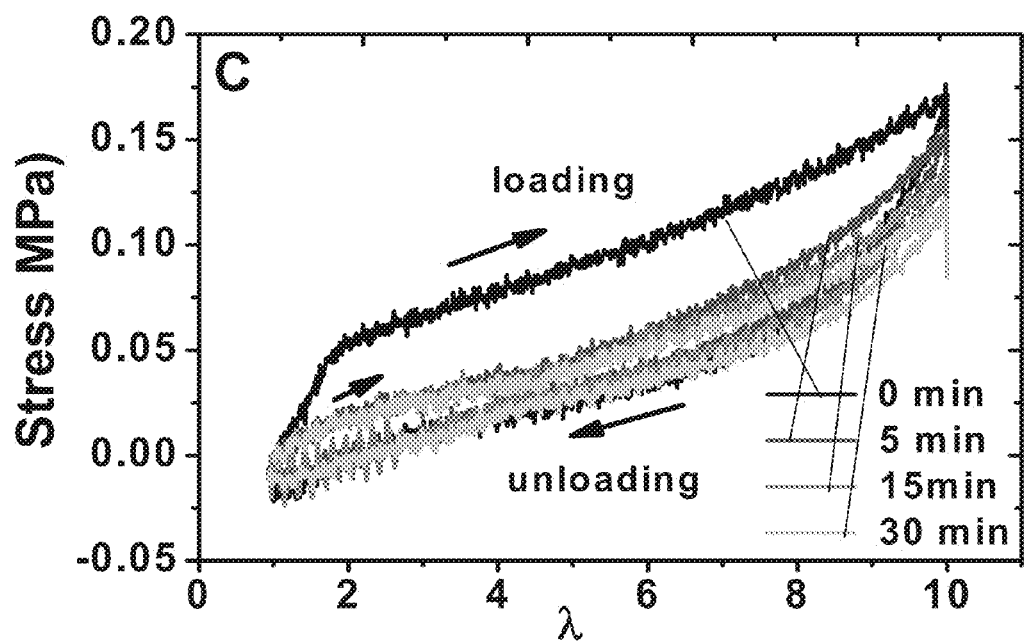
FIG. 7C shows the recovery of the Agar/Polyacrylamide Double Network Hydrogel of FIG. 7A stored at 50° C.
Figure 7D:
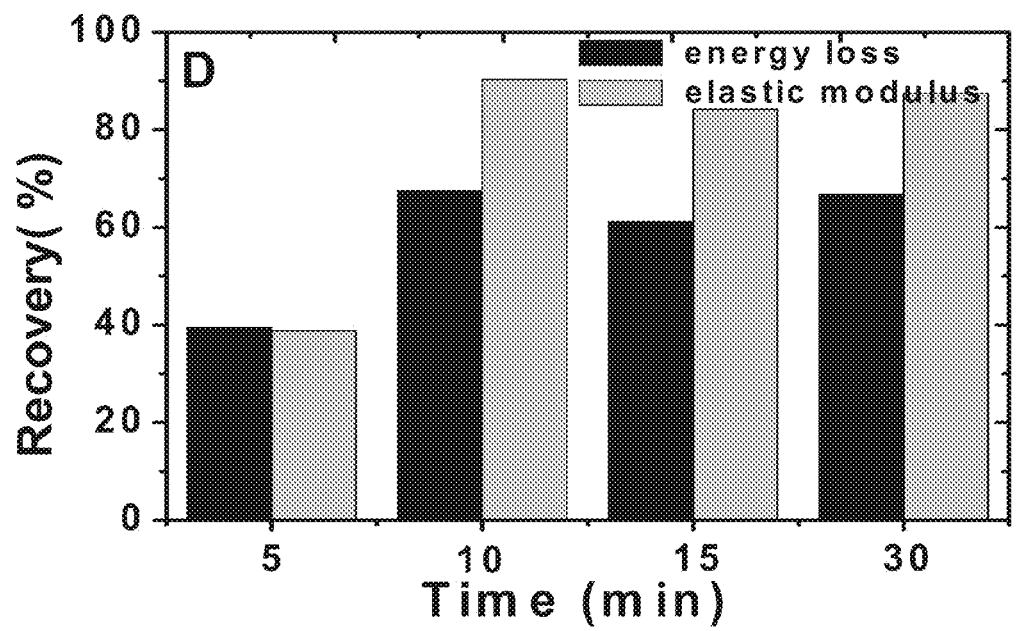
FIG. 7D shows the two types of recovery percentages (energy loss recovery and elastic modulus recovery) of the Agar/Polyacrylamide Double Network Hydrogel of FIG. 8A as a function of time at 100° C.

Since polysaccharide gels, such as agar, have a thermo-reversible property between sol and gel states, the mechanical properties can also be affected by temperature. Further loading-unloading tests were conducted to examine the time-evolution recovery property of Agar/Polyacrylamide double network hydrogel at different temperatures above and below the melting point of the agar after the first loading cycle. At 100° C. above the melting point, the hysteresis loops became larger within 10 min, but remained almost unchanged after that (FIG. 7B). However, at 50° C. below the melting point, recovery loops were hardly observed, even after 30 min (the loops were similar to those after the immediate second cycle) (FIG. 7C). The two recovery percentage rates, defined by a ratio of energy loss or elastic modulus at different store times to the first loading cycle, were 65% (based on energy loss) and 90% (based on elastic modulus) at 100° C. after 10 min (FIG. 7D). This finding clearly indicates that the temperature-responsive sol-gel transition is responsible for the recovery property of Agar/Polyacrylamide double network hydrogel, i.e. the gel network can be much better healed via a gel-to-sol transition at an elevated temperature for some time before reloading.

The recoverable energy-dissipating mechanisms for Agar/Polyacrylamide double network hydrogels were also examined. As shown in FIG. 1, when the gel is stretched, the first agar network ruptures into small clusters and dissipates energy, while the second polyacrylamide network remains intact. The small agar clusters act as a sliding cross-linker of polyacrylamide and the helical structures of the agar remain unchanged. Upon heating to a temperature above the melting point, the agar clusters refold and transform into linear conformations, which allows linear agars to interpenetrate into the polyacrylamide network. On the subsequent cooling process, the agar reforms double helix structures and aggregates into thick helical bundles. Thus, the first agar network is regenerated, leading to gel recovery. Meanwhile, as shown in FIGS. 8a to 8d, the recovery rate based on energy loss is approximately 65% and no yielding is observed for the hydrogels stored at different times after the first loading. This fact may imply that the polyacrylamide second network alters the aggregation of agar helical bundles, resulting in less than 100% recovery.

Unlike the physically cross-linked Agar/Polyacrylamide double network hydrogel, most of covalently cross-linked double network hydrogels such as PAMPS/Polyacrylamide double network hydrogels cannot recover from the stretching after the first loading, because the rupture of the covalently bonded network often causes permanent damage. The recovery ability of Agar/Polyacrylamide double network hydrogels is attributed to the unique thermo-reversible sol-gel property. The Agar/Polyacrylamide double network hydrogels exhibit similar necking, yielding, hysteresis, and soften phenomena to the PAMPS/Polyacrylamide double network hydrogels, suggesting a similar tough mechanism.

In light of the foregoing, it should be appreciated that the present invention significantly advances the art by providing a simple one-pot method to synthesize a new type of hybrid physically-chemically cross-linked double-network hydrogels using thermo-reversible sol-gel polysaccharides that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

EXAMPLE

A double network hydrogel was synthesized by a one-pot method. Briefly, 100 mg agar (gel strength >800 g/cm² with a melting point of between 85 and 95° C.), 900 mg polyacrylamide, 0.0284 g 2-hydroxy-4'-(2-hydroxyethoxy)-2-methylpropiophenone (Irgacure 2959, 1 mol % of polyacrylamide), 59 µL of N, N'-methylene-bis-acrylamide solution (MBA, 10 mg/mL, 0.03 mol % of polyacrylamide) and 5 mL $H_2O$ were added into a tube. After three degassed cycles, the tube was sealed under $N_2$ protection and heated in a 90° C. oil bath. After heating for several minutes, the agar powder was dissolved and a transparent solution was obtained. Then, the resulting solution was injected into a glass mold to cool down at room temperature for agar gel formation. Once formed, the agar gel was photo-polymerized to form a Agar/Polyacrylamide double network hydrogel using ultraviolet light with a 365 nm wavelength and 8 watt power for 1 hour. The obtained double network hydrogel was sealed in a plastic tube for tests. The agar single network gel was synthesized by simply heating and cooling the solution. The polyacrylamide single network gel was prepared using the same double network gel preparation method, except no agar was added. The use of different molds allows for the production of different shapes of the double network hydrogels. The whole process of creating double network hydrogels takes between 1 and 2 hours to complete.

What is claimed is:

1. A method of forming a hybrid physically and chemically cross-linked double-network hydrogel with highly recoverable and mechanical properties in a single-pot synthesis comprising the steps of:
   combining the hydrogel precursor reactants including:
   a. water,
   b. a polysaccharide,
   c. an acrylate monomer,
   d. an ultraviolet initiator, and
   e. a chemical crosslinker to form a single pot mixture;
   heating the hydrogel precursor reactants to a temperature higher than the melting point of the polysaccharide and retaining this temperature until the polysaccharide is in a sol state;
   cooling the single-pot to a temperature lower than the gelation point of the polysaccharide and retaining this temperature to form a first network; and
   thereafter photo-initiating polymerization of the acrylate monomer via the ultraviolet initiator to form the second network, wherein the double-network hydrogel has a polysaccharide concentration of 20 mg/mL, an acrylate monomer concentration of 3.4 mol/L, a ultraviolet initiator concentration of 1 mol % of acrylate monomer, and a chemical crosslinker concentration of 0.03 mol % of acrylate monomer.

2. The method of claim 1 wherein the hydrogel precursor reactants are heated to a temperature of from 90-95° C.

3. The method of claim 1 wherein the hydrogel precursor reactants are retained at the temperature higher than the melting point of the polysaccharide for a period of 3-5 minutes.

4. The method of claim 1 wherein the single-pot is cooled to a temperature of from 30-40° C.

5. The method of claim 1 wherein the cooled single-pot is retained at a temperature lower than the gelation point of the polysaccharide for a period of 15-30 minutes.

6. The method of claim 1 wherein the polysaccharide as the first network is selected from the group consisting of agar, gelatin, sodium alginate, carrageenan, and other stimuli-responsive and reversible sol-gel systems including supermolecular hydrogels and self-healing hydrogels.

7. The method of claim 6 wherein the polysaccharide is agar.

8. The method of claim 1 wherein the acrylate monomer as the second network is selected from the group consisting of acrylamide, methylacrylamide, acrylic acid, N,N'-dimethylacrylamide, N-isopropylacrylamide, and ethylene glycol diacrylate.

9. The method of claim 8 wherein the acrylate monomer is acrylamide.

10. The method of claim 1 wherein the ultraviolet initiator is selected from the group consisting of 2-hydroxy-4'-(2-hydroxyethoxy)-2-methylpropiophenone and 2-oxoglutaric acid.

11. The method of claim 10 wherein the ultraviolet initiator is 2-hydroxy-4'-(2-hydroxyethoxy)-2-methylpropiophenone.

12. The method of claim 1 wherein the chemical crosslinker is selected from the group consisting of N, N'-methyl-bis-acrylamide and poly(ethylene glycol) diacrylate.

13. The method of claim 12 wherein the chemical crosslinker is N, N'-methyl-bis-acrylamide.

14. The method of claim 1 wherein the forming of the hybrid physically and chemically cross-linked double-network hydrogel takes between 1 and 2 hours to complete.

* * * * *